Feb. 12, 1924. 1,483,809
M. R. HULL
CONNECTER FOR TWO-PART AUTOMOBILE DOORS
Filed Dec. 30, 1921
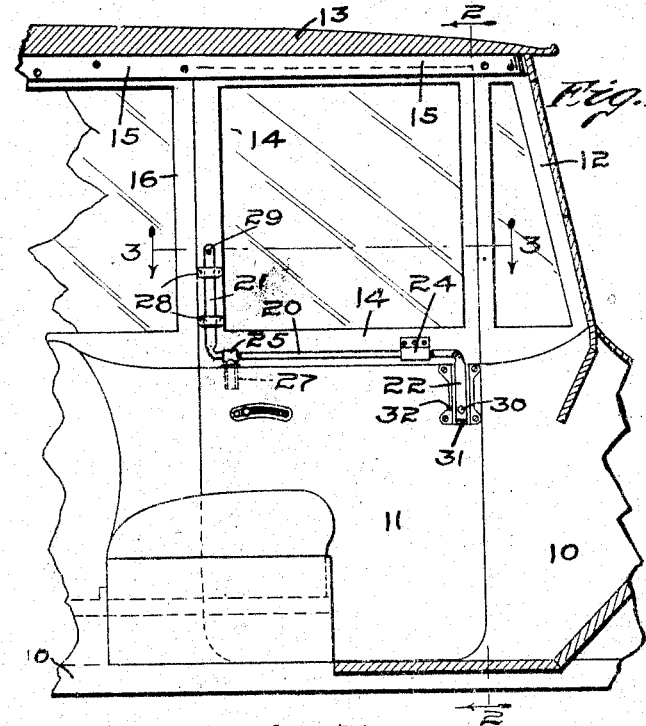
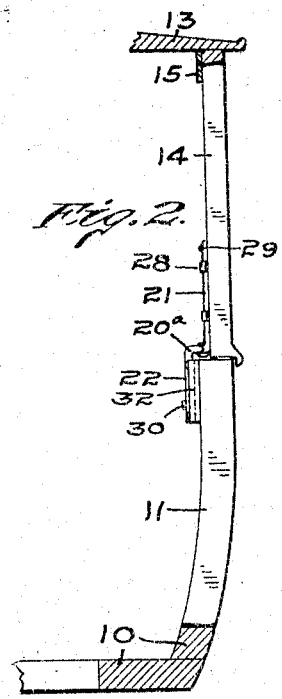
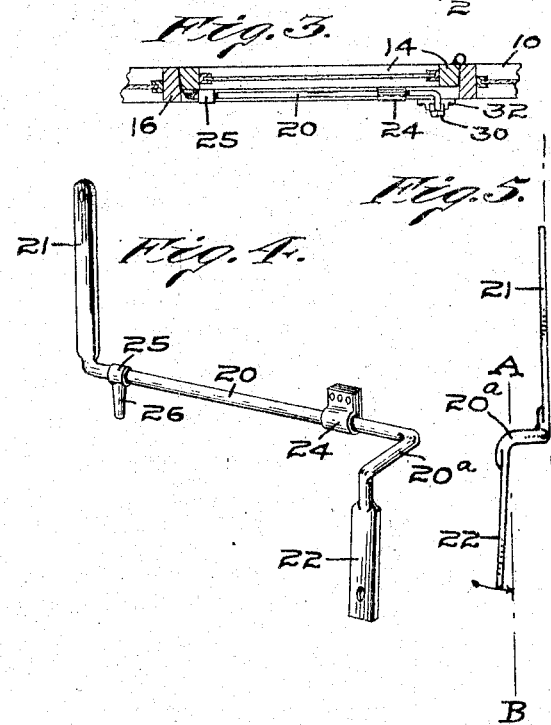
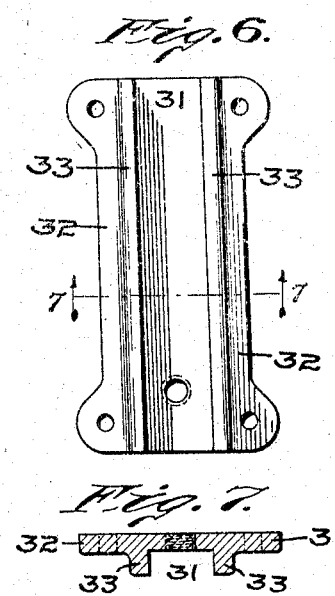
INVENTOR:
Matthew R. Hull,
By Frank H. Woerner
ATTORNEY.

Patented Feb. 12, 1924.

1,483,809

UNITED STATES PATENT OFFICE.

MATTHEW R. HULL, OF CONNERSVILLE, INDIANA, ASSIGNOR TO REX MANUFACTURING COMPANY, OF CONNERSVILLE, INDIANA, A CORPORATION.

CONNECTER FOR TWO-PART AUTOMOBILE DOORS.

Application filed December 30, 1921. Serial No. 525,927.

*To all whom it may concern:*

Be it known that I, MATTHEW R. HULL, a citizen of the United States, residing at Connersville, in the county of Fayette and State of Indiana, have invented certain new and useful Improvements in Connecters for Two-Part Automobile Doors, of which the following is a specification.

This invention relates to an automobile body door, particularly that type of door which includes the lower door section of a permanent automobile body and an upper complementary section, the latter section forming a part of an independently fabricated enclosed top which is superimposed upon the rim of an open type of automobile body. In this type of door construction it has been found difficult to keep the edge of the upper complementary section of the door in contact with the external wall of the top, when the door is closed, by reason of the open joint remaining between the two connected door sections which may impair the desired rigidity, as obtains in the solid type of door construction, thereby permitting the upper section of the door to stand away from the adjacent external wall of the top to induce noise and rattle, besides impairing the desired symmetrical appearance of the top structure, so characteristic in the rigid types of limousine and sedan body constructions.

One of the objects of the present invention consists in the provision of certain means whereby a stress is constantly imposed on the upper complementary door section to hold the latter at all times into contact with the adjacent external wall of the top, when the door is closed, and thus prevent vibration and rattle of the parts.

I accomplish the above object of the invention, and such others as may appear from a perusal of the following description and claims, by means of the construction illustrated in the accompanying drawings, forming a part hereof, in which—

Figure 1 is a fragmentary detail sectional view of the forward portion of an open type automobile body, having a detachable top superimposed thereon, and showing my improved tension-connecter attached to the two sections of the door. Fig. 2 is a view partly in section and partly in elevation, on the plane 2—2 in Fig. 1. Fig. 3 is a horizontal sectional view, on the plane 3—3 in Fig. 1. Fig. 4 is a perspective view of the tension-connecter shown independently of the other parts. Fig. 5 is an end view of the construction shown in Fig. 4. Fig. 6 is an enlarged view in elevation of the base plate for anchoring the tension-connecter to the lower and permanent section of the door. Fig. 7 is a cross sectional view, on the plane 7—7 in Fig. 6.

Referring to the drawings, 10 represents a conventional type of automobile body construction; 11 a permanent door section; 12 a separately fabricated top having a deck 13 which is superimposed upon the rim of the open body 10, and 14 the upper door section which constitutes a complementary part of the removable top 12. Top 12 is provided along its inner side walls and immediately below deck 13 with certain reinforcing rails 15 which, in addition to adding strength and rigidity to the top, provide the means for attaching the side panels 16 of the top and also stops against which the upper edges of the door sections 14 abut when the doors are in closed position.

As heretofore stated, considerable difficulty has been experienced in keeping the edges of the upper door section 14 in contact with the adjacent external surface of top 12, for the reason that in this type of divided door construction the vibration of the vehicle may develop sufficient looseness between the two sections of a door and thus permit the upper door section 14 to spring away from the vehicle body and create rattle of the parts, besides impairing the symmetrical external appearance desired in a composite structure, which is so characteristic of the solid built types of limousine and sedan constructions.

These above mentioned beneficial advantages and results I attain by means of a connecter which comprises, preferably, a resilient rod 20, having its ends flattened and bent at right angles—but in opposite directions—to its body portion to form the attachment feet 21 and 22. In operative position the main body of rod 20 is disposed and supported horizontally in a plane slightly above the upper rim of body 10 by means of a loop 24 which permanently attaches said rod to the upper door section 14, together with a guide-post 25 which is provided with a shank 26 adapted to be inserted into a socket 27 in the upper edge or rim of body 10, so that while rod 20 is thus securely anchored to both sections of the door it may easily be disengaged from the lower door section 11 when it is desired to remove the upper door section 14, for summer driving. The vertical foot 21, of rod 20, normally rests against the inner surface of the frame of upper door section 14 by passing foot 21 through suitable loops 28 carried by the upper door section 14 and then permanently securing the foot to the door section by means of a screw 29. Loops 28 enable the upper door section 14 to be vertically adjusted to fit into the desired opening, which is of considerable importance because it enables a user, to whom the top is shipped, to readily make all necessary adjustments and thereby realize the full benefits of the article purchased. When the material forming door section 14 is of less thickness than the permanent door section 11, as shown in Fig. 2, rod 20 may be bent, as at 20ª, to form the necessary reach for extending the rod over and down along the inner side wall of said lower door section 11. Foot 22 is detachably secured to the lower door section 11 by means of a bolt 30, as clearly shown in Fig. 1 of the drawings. To steady rod 20 and still enable it to be easily disconnected from the lower door section 11, when it is desired to remove the upper door section 14, I insert foot 22 into a snugly fitting channel 31 formed in a base plate 32 which is securely bolted to the inner face of the lower door section 11, and the foot 22 is held within the channel of said base plate by a bolt 30.

By means of this construction foot 22 is securely held in operative position between ribs 33, forming channel 31, and may readily be detached by the loosening of bolt 30. As will be observed in the edge view, Fig. 5, the face of foot 21 is initially formed to coincide with the perpendicular, whereas the face of foot 22 is inclined towards the surface plane of the face of foot 21. When it is desired to attach the foot 22 to door section 11 said foot is sprung inwardly until its face rests against the bottom of channel 31 in base plate 32. This enforced movement of foot 22 develops a twist or torque in the resilient body portion of rod 20, and the reactive forces thus set up in rod 20 are exerted against the upper door section 14 and hold it tightly against the adjacent external wall of top 12 to prevent noise and rattle. Hence, in the act of closing the door, the edge of the upper door section 14 will be the first to come into contact with reinforcing rail 15 and this edge will be more tightly pressed against said rail and thereby increase the torque in rod 20 as the closing movement of the door continues.

By means of the herein described construction it will be readily comprehended that the stressed rod 20 is constantly exerting sufficient pressure against the upper door section 14 to constantly hold the latter tightly into contact with adjacent side wall of top 12 and prevent individual vibration and rattle of the parts.

Having thus fully described my said invention, what I desire to secure by Letters Patent, is—

1. In a door for automobiles, a permanent lower door section, a removable upper door section, a connecter carried by the upper section having a resilient body approximately parallel to the meeting edges of the sections and having its ends bent oppositely, means for securing one end and the body of the connecter permanently to the upper door section, a pivoted post depending from the body near said end adapted to enter a socket in the lower door section, a guide plate on the lower door section, and means for detachably securing the other end of the connecter thereto so as to tilt the upper door section toward the body whereby a progressively increasing torque is induced in the body of the connecter when the edge of the door section engages the top of the auto body during the closing movement of the door, substantially as set forth.

2. In a door for automobiles, a permanent lower door section, a removable upper door section, a connecter carried by the upper door section having a resilient body approximately parallel to the meeting edges of the sections and having its ends bent oppositely, and means for securing one end to the upper door section and the other end to the lower door section near opposite vertical edges of the respective sections so as to tilt the upper door section toward the body whereby a progressively increasing torque is induced in the body of the connecter when the edge of the upper door section engages the top of the auto body during the closing movement of the door, substantially as set forth.

3. In a door for automobiles, a permanent lower door section, a removable upper door section, a connecter carried by the upper section having a body approximately equal in length to the width of the door and approximately parallel to the meeting edges of the door sections the ends of the connecter being bent in opposite directions, and means for securing the connecter permanently to the upper section and detachably to the lower section, substantially as set forth.

4. In a door for automobiles, a permanent lower door section, a removable upper door section, and a connecter therefor comprising a resilient rod bent between its ends to form angularly related parts lying in the same plane and having its ends bent to extend respectively up and down approximately perpendicularly to said plane, substantially as set forth.

5. In an automobile door having a permanent lower section and a removable rigid upper section, a connecter having a resilient body extending adjacent to the dividing line between said sections, an arm for connection to the upper section at its rear end, an arm for connection to the lower section at its front end said arms being inclined laterally out of parallel relation whereby the upper door section is normally tilted inwardly, and brackets journaling the body near its ends extending oppositely from the respective arms adjacent thereto and secured to the other door section from such adjacent arms, substantially as set forth.

In witness whereof, I, have hereunto set my hand and seal at Connersville, Indiana, this 22nd day of December, A. D., one thousand nine hundred and twenty-one.

MATTHEW R. HULL.